United States Patent [19]
Tinsley

[11] 3,850,247
[45] Nov. 26, 1974

[54] PLACING ZONES OF SOLIDS IN A SUBTERRANEAN FRACTURE

[75] Inventor: John M. Tinsley, Duncan, Okla.

[73] Assignee: Halliburton Company, Duncan, Okla.

[22] Filed: Aug. 27, 1973

[21] Appl. No.: 391,917

[52] U.S. Cl. .................................. 166/280, 166/308
[51] Int. Cl. ............................................. E21b 43/2
[58] Field of Search ........... 166/280, 308, 307, 281, 166/283

[56] References Cited
UNITED STATES PATENTS

| | | | |
|---|---|---|---|
| 2,859,821 | 11/1958 | Trott | 166/280 |
| 3,266,573 | 8/1966 | Rixe | 166/280 |
| 3,349,851 | 10/1967 | Huitt et al. | 166/280 |
| 3,354,959 | 11/1967 | Fast et al. | 166/280 |
| 3,364,995 | 1/1968 | Atkins et al. | 166/280 |
| 3,592,266 | 7/1971 | Tinsley | 166/283 |
| 3,642,068 | 2/1972 | Fitch et al. | 166/308 X |
| 3,709,300 | 1/1973 | Pye | 166/280 |

*Primary Examiner*—Stephen J. Novosad
*Attorney, Agent, or Firm*—John H. Tregoning; Fred E. Hook

[57] ABSTRACT

A fracture in a subterranean formation having zones of solids intermittently spaced throughout the fracture is formed by injecting alternating quantities of displacement liquid and carrier liquid having solids supported therein into the fracture to extend the fracture into the subterranean formation.

8 Claims, No Drawings

PLACING ZONES OF SOLIDS IN A SUBTERRANEAN FRACTURE

The production rate of petroleum, water and other products from a subterranean formation can often be increased by fracturing the subterranean formation. Generally, the fracture extends from a well bore penetrating the subterranean formation and is held open by solids which are placed in the fracture during the fracturing treatment. A fracture held open by solids serves as a channel through the subterranean formation for the flow of fluids to the well bore.

Many methods have been developed for placing solids in a fracture. In one method, the solids are carried into a fracture, which extends in a vertical plane from a well bore, in a liquid which will not support the solids to prevent the solids from settling through the liquid. The solids settle through the liquid as the liquid is flowing through the fracture to form a bed of the solids in a portion of the fracture. In another method, the solids are carried into a fracture in a liquid which will maintain the solids in suspension. The solids are carried with the liquid as the liquid extends the fracture and are evenly spaced throughout the fracture.

The methods just described and other similar methods of placing solids in a fracture are not completely satisfactory. In some formations the forces are so great that the solids are crushed, permitting the fracture to partially close. Generally, the crushed particles have a broad particle size range which substantially reduces the flow of fluids through the fracture. In other formations, the forces cause the solids to imbed in the formation which forms the faces of the fracture, thus permitting the fracture to partially close. Additionally, a bed of solids in a portion of a fracture or solids spaced throughout the fracture restrict the flow of fluids therethrough.

It has now been found that a fracture having open channels throughout the fracture can be formed by contacting the subterranean formation with a pad liquid at a sufficient pressure to fracture the subterranean formation, injecting the pad liquid into the fracture at a sufficient rate to open the fracture to a sufficient width to accept suitable solids for holding the fracture open, injecting alternating quantities of displacement liquid and carrier liquid having the suitable solids supported therein into the fracture at a sufficient rate to extend the fracture into the subterranean formation, and reducing the rate of injecting the liquids into the fracture to below the rate required for holding the fracture open, thereby permitting the fracture to close on the suitable solids. A fracture formed by this method is held open by intermittent zones of solids spaced throughout the fracture.

A fracture held open by intermittent zones of solids does not depend on the flow of fluids through the zones of solids for conductivity. Therefore, the zone of solids can consist of a single layer of solids or several layers of closely spaced solids to form a fracture, having wide openings between the zones of solids, for the flow of fluid therethrough.

In this method of fracturing a subterranean formation, the subterranean formation is first contacted with a pad liquid at a sufficient pressure to fracture the subterranean formation. The pad liquid is preferably a liquid containing an additive to substantially reduce the loss of carrier liquid or displacement liquid into the pore spaces of the formation being fractured. Preferably, a sufficient quantity of the pad liquid is injected into the fracture ahead of the carrier liquid and displacement liquid to substantially reduce the loss of the carrier liquid and displacement liquid into the pore spaces of the formation through which the fracture extends. An excess quantity of pad liquid is not desired as it could occupy a portion of the fracture which would otherwise be occupied by a zone of solids.

After the fracture has been initiated, the pad liquid is injected into the resulting fracture at a sufficient rate to open the fracture to a sufficient width to accept suitable solids for holding the fracture open. At low injection rates the fracture will generally be narrow and the width of the fracture generally increases as the injection rate is increased. It is considered good practice to inject the pad liquid into the fracture at a sufficient rate to open the fracture to at least about twice the width of the solids which are to be carried into the fracture to prevent the solids from being filtered out of the carrier liquid.

Pad liquids such as viscous liquids, gelled liquids, emulsions, liquid hydrocarbons and water can be used in this fracturing method without the addition of an additive to substantially reduce the loss of the carrier liquid and displacement liquid into the pore spaces of the formation through which the fracture extends. These pad liquids are generally not used without this additive, as many of these liquids, when injected into the fracture ahead of the carrier liquid and displacement liquid, do not prevent the loss of substantial quantities of carrier liquid and displacement liquid into the pore spaces of the formation as the fracture is being extended into the subterranean formation.

The carrier liquid transports the solids into the fracture formed by this fracturing method and supports the solids until the pressure on the carrier liquid is released and the forces in the fracture formation cause the fracture to close. The carrier liquid must support the solids until the fracture closes; however, some settling of the solids through the carrier liquid is not detrimental. Settling of the solids through the fracturing liquid is not detrimental as long as a substantial part of the solids do not settle out of the carrier liquid.

Viscous liquids, gelled liquids and emulsions have been used for fracturing subterranean formations and are useful as carrier liquids in this fracturing method. These liquids have varying viscosities and/or gel strengths and will support solids having various particle sizes and densities.

In this fracturing method, the displacement liquid is injected into the fracture to displace the carrier liquid having solids supported therein into the fracture. In some fracturing treatments performed by this method, the same liquid is used as the carrier liquid and displacement liquid. However, it is not required that the same liquid be used as the carrier liquid and displacement liquid. It is thought that when the displacement liquid and carrier liquid have similar viscosities and/or gel strengths or when the displacement liquid has higher viscosities and/or gel strengths than the carrier liquid, the displacement liquid will displace the carrier liquid into the fracture with minimal mixing at the interface of displacement liquid and carrier liquid such that the carrier liquid and displacement liquid remain as integral units in the fracture. When the viscosity and/or gel strength of the displacement liquid is lower than the viscosity and/or gel strength of the carrier liquid, the displacement fluid can flow through the carrier liquid to separate the carrier liquid into small units of carrier liquid. Separation of the carrier liquid into small quantities has not been found to materially reduce the percentage of the interconnecting open areas for flow of fluids through the resulting fracture.

The solids are selected such that the zones of solids produced by this fracturing method will keep the fracture open at a desired width. A fracture having a desired width can be formed by the use of a single layer of solids or several layers of solids. The particle size of the solids which can be used is determined, at least in part, by the viscosity and/or gel strength of the carrier liquid. A carrier liquid having a high viscosity and/or gel strength can be used to place large diameter solids in a fracture while a carrier liquid having a low viscosity and/or gel strength can be used to place small diameter solids in a fracture.

A fracture formed by this method is held open by intermittent zones of solids spaced throughout the fracture to provide open flow channels through the fracture. This requires that the zones of solids be spaced within the fracture such that the fracture between the zones of solids will not completely close when the rate of injecting liquid into the fracture is reduced below the rate required for holding the fracture open. The surface area and thickness of the zones of solids, as well as the spacing of the zones of solids, are important to prevent the subterranean formation from closing between the zones of solids.

Placement of intermittent zones of solids in a fracture is accomplished by injecting alternating quantities of displacement liquid and carrier liquid having solids supported therein into the fracture as the fracture is being extended into the subterranean formation. The injection of a quantity of carrier liquid followed by a quantity of displacement liquid into the fracture is herein defined as a stage in this fracturing method. Each stage of this fracturing treatment should have about 0.25 to 1.5 volumes, and preferably about 0.5 to 1.25 volumes, of displacement liquid to displace each volume of carrier liquid having solids supported therein into the fracture. If less than about 0.25 volumes of displacement liquid are used to displace each volume of carrier liquid into the fracture, the open area between the zones of solids is so small that little benefit is derived from performing this fracturing method as compared to the method, as hereinabove described, of carrying the solids into the fracture in a liquid which will maintain the solids in suspension such that the solids will be evenly spaced throughout the fracture. If greater than about 1.5 volumes of displacement liquid are used to displace each volume of carrier liquid, the fracture between the zones of solids in some subterranean formations will close. The fracture must remain open between the zones of solids for the fluid to have an open passage through the fracture. To assure that the fracture remains open at the well bore from which the fracture extends, it is considered a good practice to inject the final stage of carrier liquid having solids supported therein into the fracture and to displace the carrier liquid into the fracture with a small volume of displacement liquid.

These fracturing treatments should be designed for at least two stages and can be designed for a multitude of stages. The number of stages is generally determined by the quantity of liquid which will be injected into the fracture to extend the fracture into the subterranean formation. However, it has been found that better results are obtained with several small, closely spaced zones of solids than with a few widely spaced zones of solids. When the elasticity of subterranean formation and the forces in the subterranean formation are known, the optimum size, thickness and spacing of the zones of solids can be determined.

A fracturing treatment using the methods described in this application has been designed for the Cleveland sandstone formation in Hansford County, Tex. This treatment is designed to create a vertical fracture which extends about 750 feet from a well bore, has a height of about 60 feet and has about 29.4 percent open space between the zones of solids. When this treatment is performed with a carrier liquid and displacement liquid having an average viscosity of about 4,180 centipoises, the width of the fracture during the treatment is about 0.754-inch. The fracture is initiated by first contacting the formation with 8,150 gallons of pad liquid. When the treatment is performed with three pounds of 10–20 mesh U.S. Sieve Series sand supported in the carrier liquid, an 18-stage treatment is required. Each stage is performed by injecting 1,256 gallons of carrier liquid having solids supported therein into the fracture and displacing the carrier liquid into the fracture with 1,189 gallons of displacement liquid. When the treatment is performed with six pounds of 10–20 mesh U.S. Sieve Series sand supported in the liquid, a 10-stage treatment is required. Each stage is performed by injecting 2,004 gallons of carrier liquid having solids supported therein and displacing the carrier liquid into the fracture with 2,124 gallons of displacement liquid.

It will be apparent that many widely different embodiments of this invention may be made without departing from the spirit and scope thereof, and therefore it is not intended to be limited except as indicated in the appended claims.

What is claimed is:

1. A method of fracturing a subterranean formation which comprises the steps of:
   a. contacting a subterranean formation with a pad liquid at a pressure sufficient to produce a fracture in said formation;
   b. injecting said pad liquid into said produced fracture at a rate sufficient to open said fracture to a width sufficient to accept solids sufficient for maintaining said fracture in said open position;
   c. introducing at least one stage of carrier liquid and displacement liquid into said produced fracture at a rate sufficient to extend said fracture into said formation wherein said stage consists essentially of one volume of said carrier liquid followed by about 0.25 to about 1.5 volumes of said displacement liquid per unit volume of said carrier liquid and further wherein said carrier liquid contains said solids supported therein; and
   d. reducing the rate of injecting liquid into said fracture to thereby permit said fracture to close on said solids.

2. The method of fracturing a subterranean formation as recited in claim 1 wherein at least two of said stages are injected into said fracture.

3. The method of fracturing a subterranean formation as recited in claim 2 wherein each volume of said carrier liquid is displaced into said fracture with about 0.5 to 1.25 volumes of said displacement liquid.

4. The method of fracturing a subterranean formation as recited in claim 3 wherein said pad liquid contains an additive to substantially reduce the loss of said carrier liquid and displacement liquid into the pore spaces of the formation through which said fracture extends.

5. The method of fracturing a subterranean formation as recited in claim 3 wherein said pad liquid is injected into said fracture at a sufficient rate to open said fracture to at least twice the width of said solids.

6. The method of fracturing a subterranean formation as recited in claim 3 wherein said carrier liquid and said displacment liquid have similar viscosities.

7. The method of fracturing a subterranean formation as recited in claim 3 wherein said displacement liquid has a lower viscosity than said carrier liquid.

8. The method of fracturing a subterranean formation as recited in claim 3 wherein less of said displacement liquid is injected into said fracture following the injection of the final volume of said carrier liquid than is injected into said fracture to displace the other volumes of said carrier liquid into said fracture.

* * * * *